(12) United States Patent
Nakamura et al.

(10) Patent No.: US 6,504,346 B2
(45) Date of Patent: Jan. 7, 2003

(54) ROTARY ELECTRIC MACHINE FOR VEHICLE

(75) Inventors: Shigenobu Nakamura, Anjo (JP); Atsushi Umeda, Okazaki (JP); Masatoshi Kohmura, Toyota (JP)

(73) Assignee: Denso Corporation, Kariya (JP)

( * ) Notice: Subject to any disclaimer, the term of this patent is extended or adjusted under 35 U.S.C. 154(b) by 25 days.

(21) Appl. No.: 09/883,204

(22) Filed: Jun. 19, 2001

(65) Prior Publication Data

US 2001/0054882 A1 Dec. 27, 2001

(30) Foreign Application Priority Data

Jun. 22, 2000 (JP) ........................................ 2000-188276
Jul. 5, 2000 (JP) ........................................ 2000-203693

(51) Int. Cl.[7] .................................................. H02P 9/00
(52) U.S. Cl. ........................................... 322/90; 322/91
(58) Field of Search ............................. 322/27, 28, 37, 322/89, 90, 91

(56) References Cited

U.S. PATENT DOCUMENTS

| | | | |
|---|---|---|---|
| 4,228,391 A | * 10/1980 | Owen | ........................ 310/112 |
| 4,788,486 A | * 11/1988 | Mashino et al. | ............... 307/16 |
| 4,825,139 A | 4/1989 | Hamelin et al. | ............... 322/90 |
| 5,059,886 A | 10/1991 | Nishimura et al. | ........... 322/28 |
| 5,245,267 A | * 9/1993 | Pierret et al. | ................ 320/119 |
| 5,444,355 A | * 8/1995 | Kaneyuki et al. | ............. 322/58 |
| 5,585,708 A | * 12/1996 | Richardson et al. | ........ 318/722 |
| 5,694,311 A | 12/1997 | Umeda et al. | ................ 363/89 |
| 5,726,557 A | 3/1998 | Umeda et al. | ................ 322/21 |
| 5,764,036 A | * 6/1998 | Vaidya et al. | ................ 310/149 |
| 6,087,734 A | * 7/2000 | Maeda et al. | ............... 180/65.2 |

* cited by examiner

*Primary Examiner*—Nicholas Ponomarenko
(74) *Attorney, Agent, or Firm*—Oliff & Berridge, PLC

(57) ABSTRACT

A rotary electric machine has two sub-windings shifted by 30 degrees from each other. Each sub-winding is connected to an individual bridge which has MOS transistors on the ground sides. It is possible to supply a charging current even at a low rotational speed by switching the MOS transistors at a high-frequency. The basic components of magnetic force are canceled because of the shifted sub-windings. The switching components of the magnetic forces generated by the switching operation are canceled by switching two groups of the MOS transistors in opposite states. As a result, it is possible to decrease the magnetic noise significantly.

20 Claims, 10 Drawing Sheets

ROTARY ELECTRIC MACHINE FOR VEHICLE

CROSS REFERENCE TO RELATED APPLICATION

This application is based on Japanese Patent Application No. 2000-188276 filed on Jun. 22, 2000 and No. 2000-203693 filed on Jul. 5, 2000 the contents of which are incorporated herein by reference.

BACKGROUND OF THE INVENTION

1. Field of the Invention

The present invention relates to a rotary electric machine for a vehicle.

2. Description of Related Art

JP-A-63-87137(U.S. Pat. No. 4,825,139) discloses a rotary electric machine for a vehicle. The machine has a full bridge circuit that has MOS transistors. The MOS transistor can act as either a switch or a diode. Therefore, when the MOS transistors are turned off, they act as a rectifier bridge connection forming a diode rectifier. When the MOS transistors are turned on, they act as a short circuit connection. This machine induces a charging current even at a low rotational speed by alternating the short circuit connection and the bridge connection by rapidly turning the MOS transistors on and off. When the machine acts as a motor, a driving current from an outside source is supplied to the stator winding to provide a rotating magnetic field by controlling the MOS transistors. FIG. 13 and FIG. 14 of that patent disclose an embodiment which controls two groups of opposed phases in a complementary manner.

The rotary electric machine disclosed in JP-A-63-87137 generates audible noise because a magnetic field in the stator core is changed at a high-frequency. Further, such high-frequency noise is very harsh and loud relative to other noises from other rotary machines and the engine at a low rotational speed range.

Further, the rotary electric machine disclosed in JP-A-63-87137 can not supply a plurality of voltages.

SUMMARY OF THE INVENTION

The present invention addresses these drawbacks by providing an improved rotary electric machine for a vehicle.

According to a first aspect of the present invention, a rotary electric machine has two sub-windings shifted by a predetermined electric angle. The rotary electric machine has bridges connected to the sub-windings. At least one of the bridges is interchangeable between a rectifier bridge connection and a short circuit connection in response to a high-frequency switching control by a controller. Therefore, audible noise can be reduced by canceling major components of magnetic forces generated by the sub-windings, and a current can be supplied from a low rotational speed.

According to a second aspect of the present invention, two bridges are interchangeable between two connection states. The second bridge is in a substantially opposite connection state to the first bridge. The second bridge is in the rectifier bridge connection when the first bridge is in the short circuit connection. The second bridge is in the short circuit connection when the first bridge is in the rectifier bridge connection. Therefore, audible noise generated by a high-frequency switching operation can be decreased by canceling magnetic forces of the first and second sub-windings.

According to a third aspect of the present invention, a rotary electric machine has two sub-windings which have individual output terminals. The rotary electric machine has switches connected to at least one of the sub-windings for switching between a short circuit connection and a rectifier bridge connection. Therefore, two voltages can be supplied from the sub-windings, and a current can be induced in at least one of the sub-windings even from a low rotational speed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

An electric power source system for a vehicle including an alternator according to a first embodiment of the present invention is described with reference to the drawings. FIGS. 1 through 6 show the first embodiment of the present invention.

Figure 1:
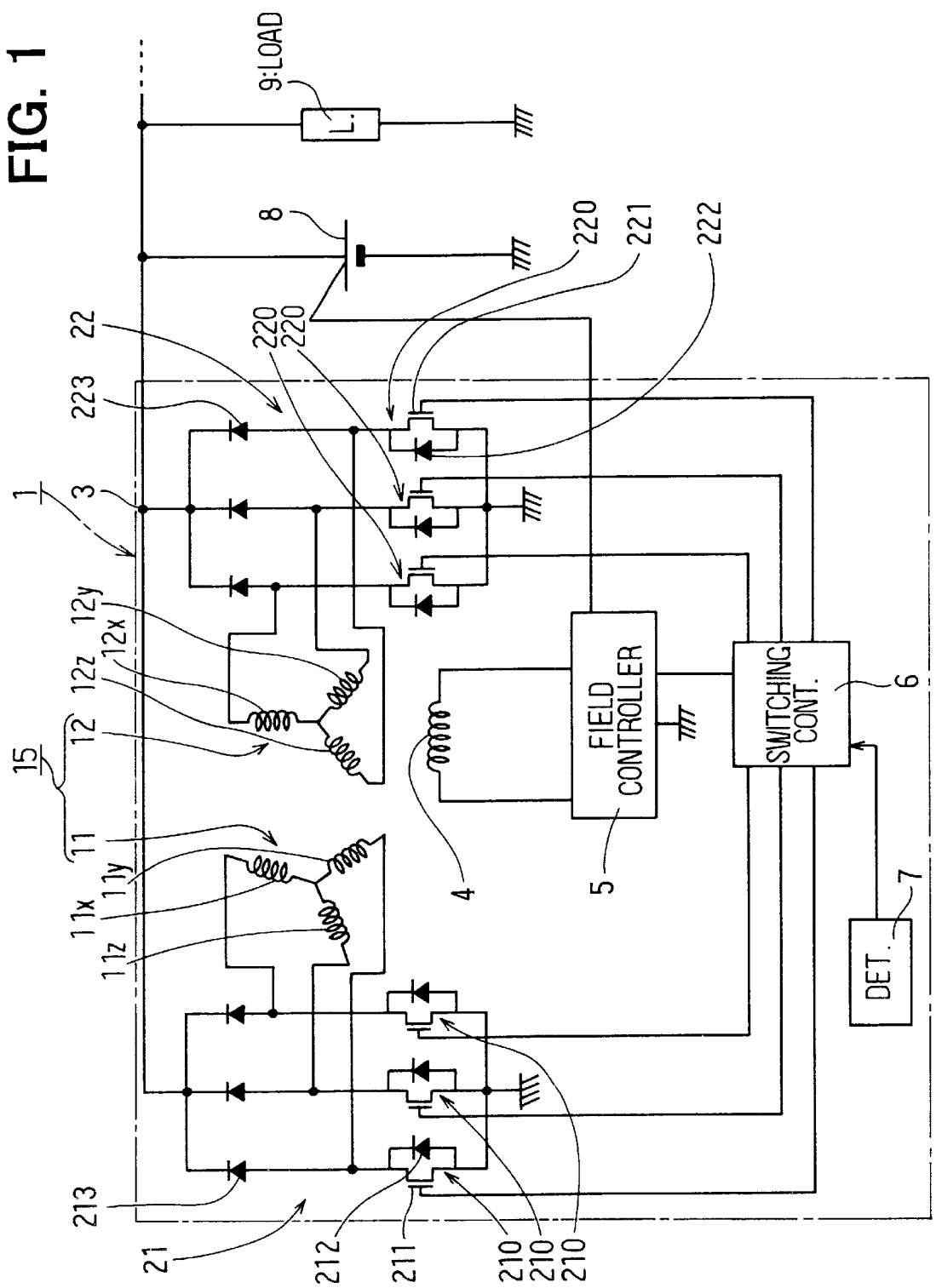
FIG. 1 is a circuit diagram of an electric power source system for a vehicle including an alternator according to a first embodiment of the present invention.
Figure 2A:
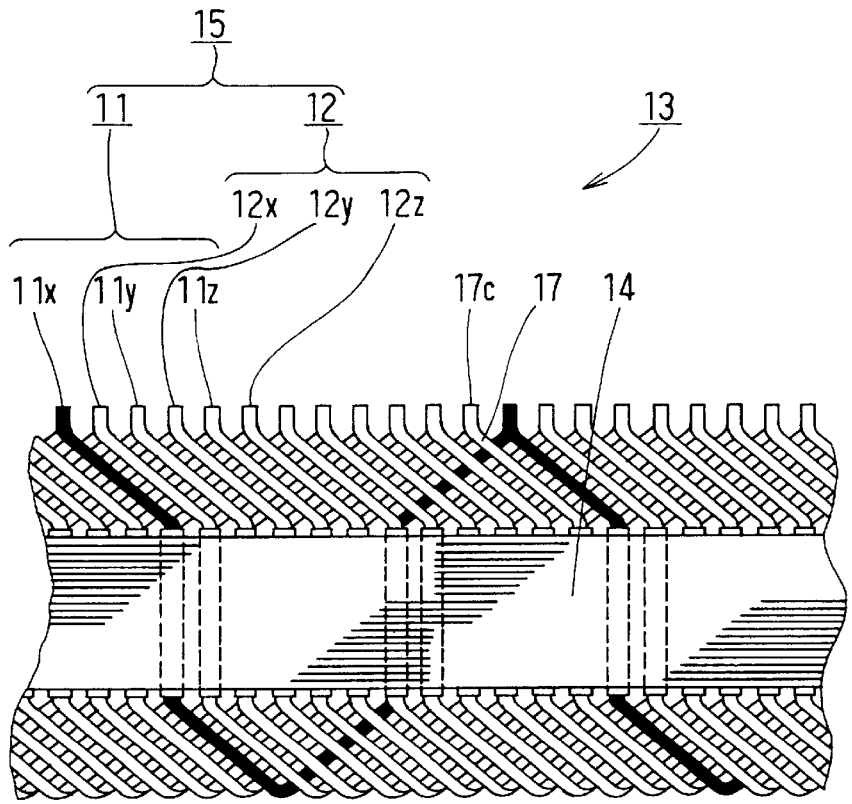
FIGS. 2A through 2E are wiring diagrams showing an outside view of the stator and cross-sectional views of the stator core for indicating an arrangement of slots according to the first embodiment of the present invention.
Figure 2B:
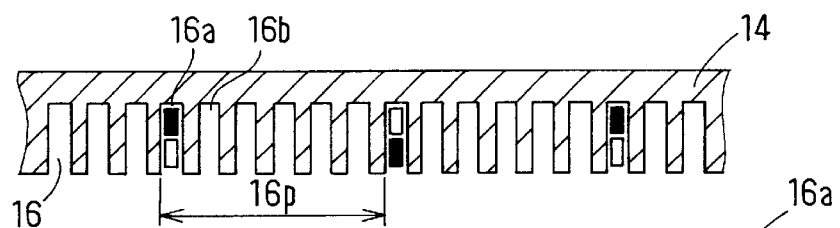
Figure 2C:
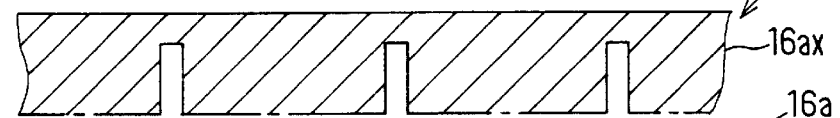
Figure 2D:
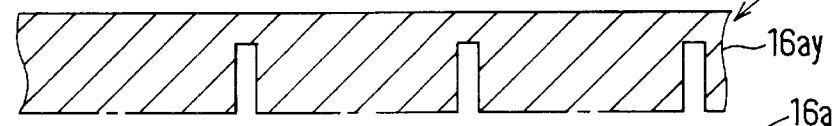
Figure 2E:
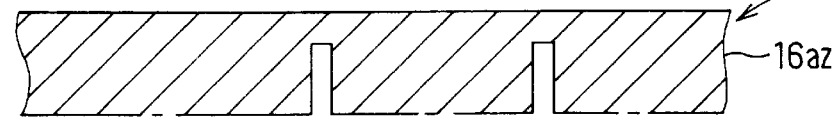
Figure 3:
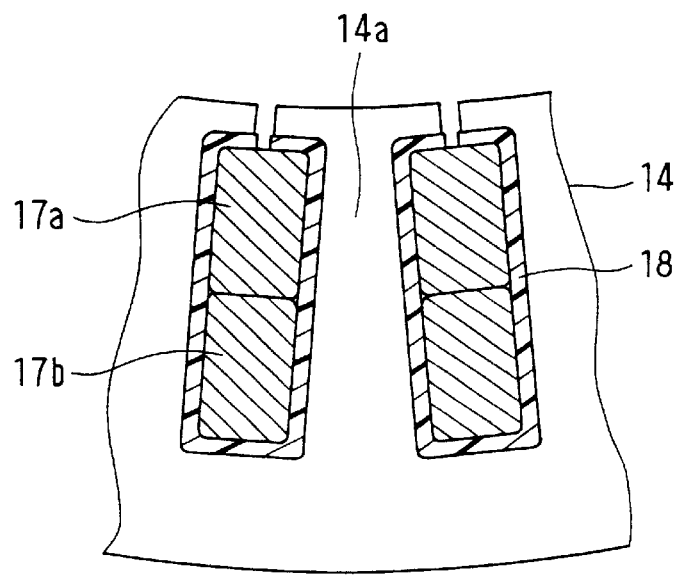
FIG. 3 is a partial sectional view of the stator according to the first embodiment of the present invention.
Figure 4:
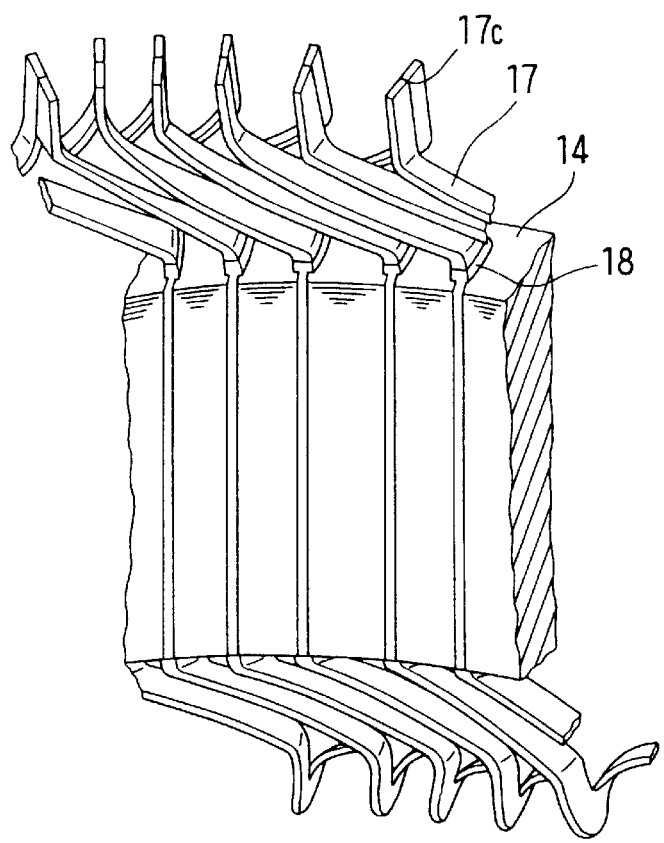
FIG. 4 is an inside view of the stator according to the first embodiment of the present invention.

FIG. 1 shows a circuit diagram of an electric power source system for a vehicle including an alternator. FIGS. 2A through 4 show an arrangement of a winding on a stator. FIG. 2A shows an outside view of the stator on which a winding has two independent sub-windings. FIG. 2B shows a cross sectional view of the stator core. Each of FIGS. 2C, 2D and 2E shows slots belonging to a slot set for accommodating one of the phase windings.

Figure 5:
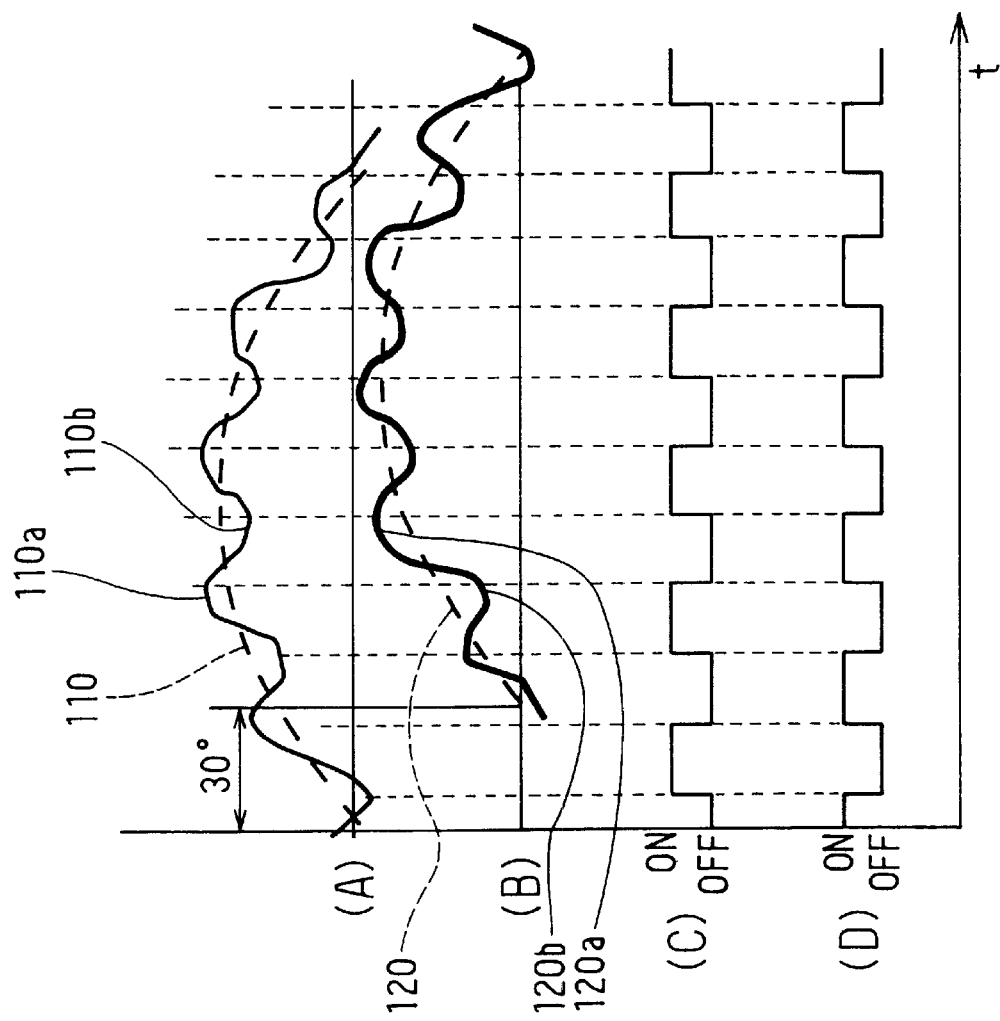
FIG. 5 is a graph showing generated voltages (A) and (B) on adjacent phase windings and switching signals (C) and (D) according to the first embodiment of the present invention.
Figure 6:
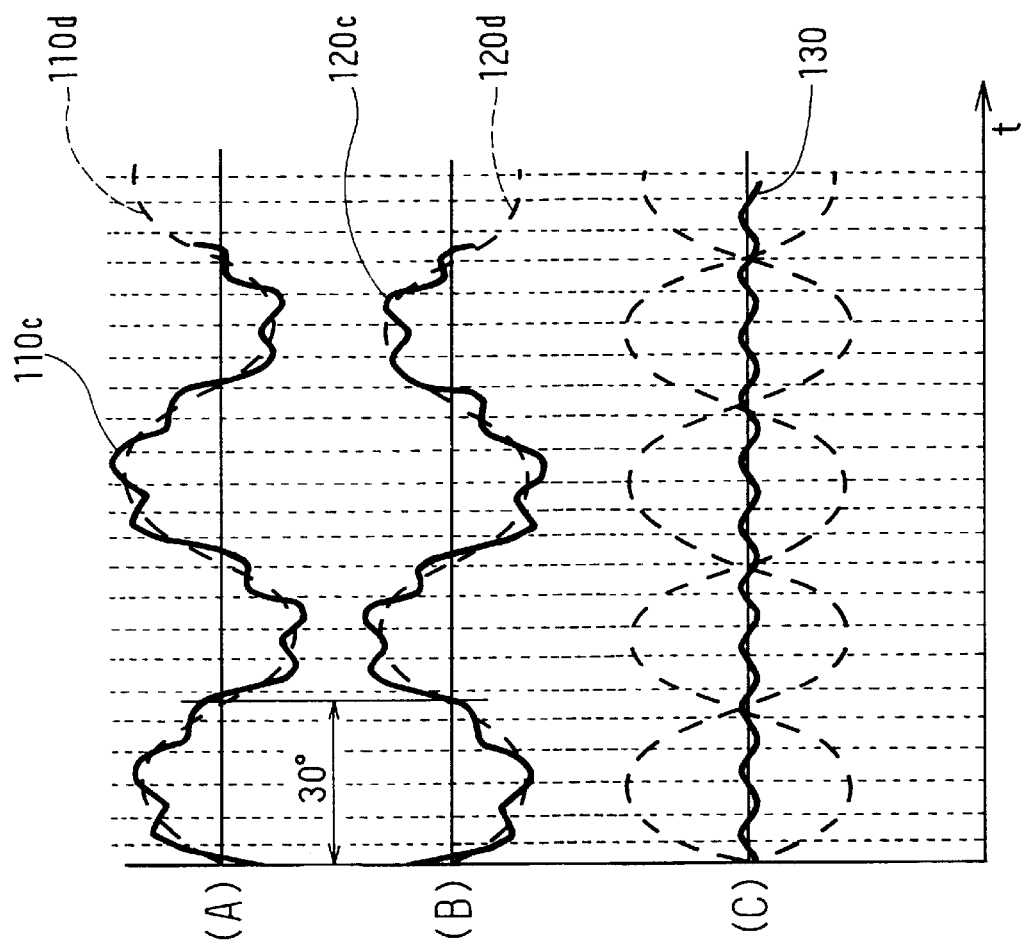
FIG. 6 is a graph showing magnetic forces (A) and (B) of sub-windings and a combined magnetic force (C) according to the first embodiment of the present invention.

FIG. 5 is a graph showing wave-forms. (A) is a voltage generated on a X-phase winding of a first sub-winding. (B) is a voltage generated on a X-phase winding of a second sub-winding. (C) is a switching signal for turning on and off switches in a first bridge. (D) is a switching signal for turning on and off switches in a second bridge. FIG. 6 is a graph showing wave-forms. (A) is a magnetic force generated by the first sub-winding. (B) is a magnetic force generated by the second sub-winding. (C) is a combined magnetic force.

Referring to FIG. 1, the alternator 1 has a poly-phase winding 15. The winding 15 has a plurality of sub-windings 11 and 12 which are star connected individual poly-phase windings. The sub-windings 11 and 12 are shifted by a predetermined electric angle from each other so that fullwave rectified outputs from the sub-windings are not synchronized and identical. In the first embodiment, the alternator 1 has two sub-windings 11 and 12 shifted by 30 degrees. The sub-windings 11 and 12 are three phase windings.

Referring to FIGS. 2A through 4, the alternator 1 has a stator 13. The stator 13 is supported on a frame (not shown), and is disposed opposite to a rotor (not shown.) The rotor is rotatably supported on the frame and has a plurality of N and S magnetic poles. The stator 13 has a stator core 14 and a poly-phase winding 15. The stator core 14 has a plurality of slots 16. The slots 16 are divided into two groups 16a and 16b. Each group has three sets, for the X-phase, the Y-phase and the Z-phase. FIG. 2 shows sets 16ax, 16ay and 16az belonging to the first group 16a. Each of the sets has a plurality of slots spaced apart a predetermined magnetic pole pitch 16p.

The poly-phase winding 15 is made of a plurality of conductor segments 17. The conductor segment 17 has a substantially rectangular cross section which matches an inner wall of the slot 16. The conductor segment 17 is made of a copper wire covered with an insulating layer. The conductor segments 17 mainly have a U-shape. The conductor segments 17 also include some irregular segments (not shown) for providing output wires, neutral connections and some of irregular connections.

The conductor segments 17 are accommodated and radially stacked in the slots 16. The slot 16 accommodates an inner conductor segment 17a and an outer conductor segment 17b stacked in a depth direction. An insulator 18 is disposed between the conductor segment 17 and the stator core 14. The conductor segments 17 are regularly aligned on both ends of the stator core 14 to provide coil ends. The inner conductor segment 17a in one of the slots is connected to the outer conductor segment 17b in the other one of the slots spaced apart by the magnetic pole pitch 16p.

The conductor segments 17 are inserted into the slots 16 from one end of the stator core 14. Therefore, turn portions of the conductor segments 17 are aligned at the one end of the stator core 14 and ends of the conductor segments 17 are aligned at the other end of the stator core 14.

The conductor segments 17 disposed in the first group 16a are welded at ends 17c thereof to form the first sub-winding 11. The first sub-winding 11 has an X-phase 11x, an Y-phase 11y and a Z-phase 11z. The conductor segments 17 disposed in the second group 16b are welded at ends 17c thereof to form the second sub-winding 12. The second sub-winding 12 has an X-phase 12x, an Y-phase 12y and a Z-phase 12z. The first sub-winding 11 and the second sub-winding 12 are shifted by 30 degrees.

In this arrangement, it is possible to increase the ratio of the cross-sectional area of the conductors to the cross-sectional area of the slot and avoid a collision of the conductor segments on the coil end. It is possible to suppress the vibration of magnetic teeth 14a of the stator core 14.

Referring to FIG. 1, the system has two bridges 21 and 22. Output wires of the first sub-winding 11 are connected to the first bridge 21. Output wires of the second sub-winding 12 are connected to the second bridge 22. The bridges 21 and 22 have corresponding diodes 213 and 223 on their high sides. The bridges 21 and 22 have corresponding MOS transistors 210 and 220 on their ground sides. Each of the MOS transistors 210 (220) has a switch 211 (221) and a diode 212 (222). The switches 211 and 221 change the connection states of the bridges 21 and 22. Each of the bridges 21 and 22 are interchangeable between a rectifier bridge connection and a short circuit connection.

Outputs from the first bridge 21 and the second bridge 22 are combined at an output terminal 3 of the alternator 1. The output terminal 3 is connected to a vehicle power supply line to supply electric power to a battery 8 and several electric loads 9. A field controller 5 detects a voltage of the battery 8 and controls an output voltage by regulating a field current supplied to a field coil 4 of the rotor.

The switches 211 and 221 are connected to a switching controller 6. The switching controller 6 inputs a signal from a detector 7 for detecting a rotational speed of the rotary electric machine. The switching controller 6 is connected with the field controller 5.

The alternator magnetizes N and S magnetic poles of the rotor by supplying a current to the field coil 4 of the rotor. The magnetic poles are rotated inside the stator core. Then, AC current is induced on the winding 15. The AC current is converted into a DC current by the bridges 21 and 22.

A switching operation of the switching controller 6 is activated when the detector 7 detects that a rotational speed of the rotor is below a predetermined value. The switching controller 6 alternately turns on and off the switches 211 and 221 to provide the short circuit connection and the rectifier bridge connection.

Referring to FIG. 5, the switching controller 6 provides complementary switching signals (C) and (D). The switching signal (C) is supplied to all of the switches 211. The switching signal (D) is supplied to all of the switches 221. The switching signal (D) is an inverted signal of the switching signal (C). These signals drive the first and second bridges 21 and 22 in substantially opposite connection states so that one of the bridges is in the rectifier bridge connection when the other is in the short circuit connection. It is preferable that the switching signals are not turned on simultaneously. Therefore, in this embodiment, an on period may be equal to or shorter than an off period.

A frequency of the switching signal is set higher than that of the voltage generated on one of the phase windings and is based on the impedance of the sub-winding and a switching loss. In this embodiment, the frequency of the switching signals is 3 kHz. It is preferable that the frequency is set from 1 to 15 kHz for an alternator that has 12 to 16 magnetic poles on the rotor.

Generated voltages on each of the phase windings are chopped by turning on and off the switches 211 and 221. An X-phase of the first winding 11 generates a waveform (A) which has peaks 110a and valleys 110b relative to an ideal sinusoidal curve 110. The waveform increases in response to the switch 211 turning on and decreases in response to the switch 211 turning off. An X-phase of the second winding 12 generates a waveform (B) which has a basic sinusoidal wave 120 shifted by 30 degrees in the electric angle from the waveform (A) with peaks 120a and valleys 120b. As a result, a charging current is supplied from the alternator even at a low rotational speed.

The valleys 120b are generated at the same timing as the peaks 110a. Similarly, the peaks 120a are generated at the same timing as the valleys 110b, because the switches 211 and 221 are controlled in substantially opposite states.

As shown in FIG. 6, a magnetic force 110c of the first winding 11 and a magnetic force 120c of the second winding 12 have deformations relative to basic sinusoidal waveforms 110d and 120d. The basic sinusoidal waveforms 110d and 120d cancel each other in a combined magnetic force 130. The deformations are almost canceled on the combined magnetic force 130 by combining the peaks with the valleys. As a result, it is possible to decrease magnetic noise significantly.

Figure 7:
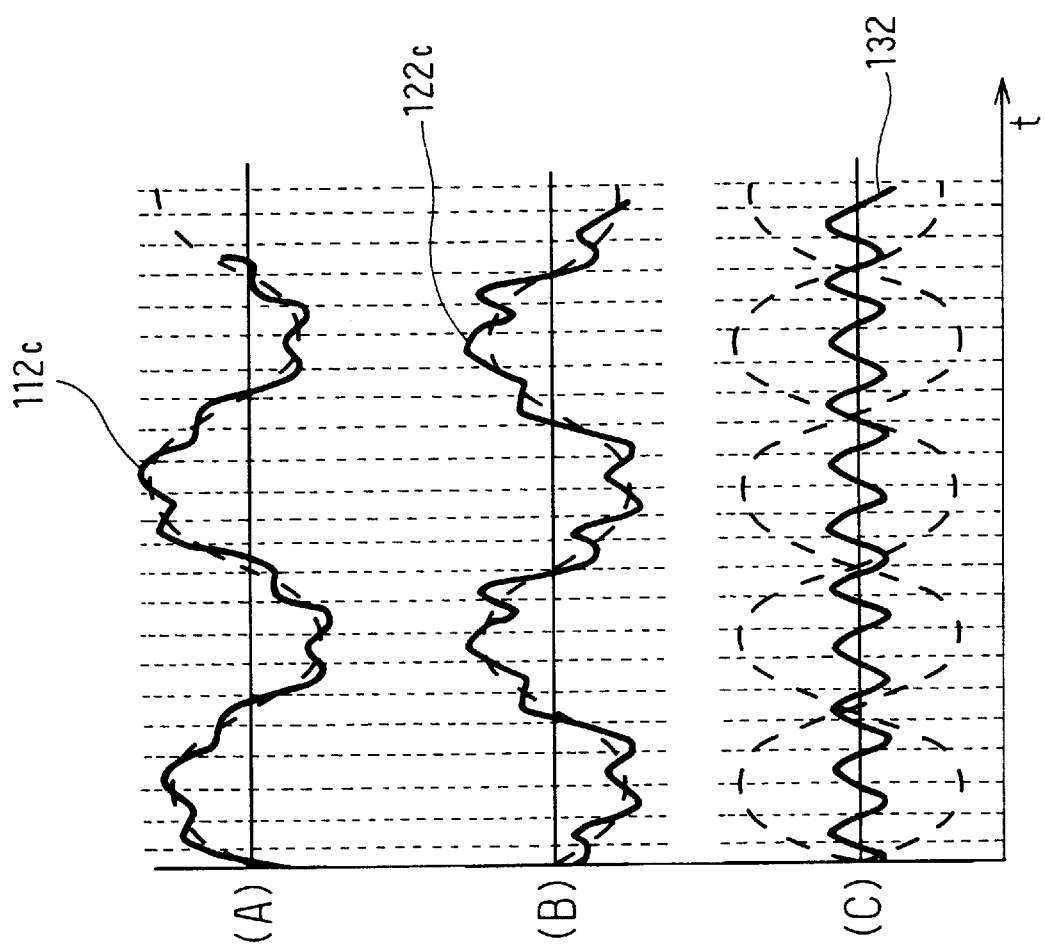
FIG. 7 is a graph showing magnetic forces (A) and (B) of sub-windings and a combined magnetic force (C) according to a second embodiment of the present invention.

FIG. 7 shows a second embodiment of the present invention. In this embodiment, the switching signals for the switches 211 and 221 are synchronized. Therefore, the deformations appearing on the waveforms 112c and 122c are synchronized. As a result, although the deformations of the magnetic force are summed, the basic sinusoidal waveforms are canceled on a combined magnetic force 132. Therefore, it is possible to output power at a low rotational speed and some decrease in the amount of magnetic noise decrease.

Figure 8:
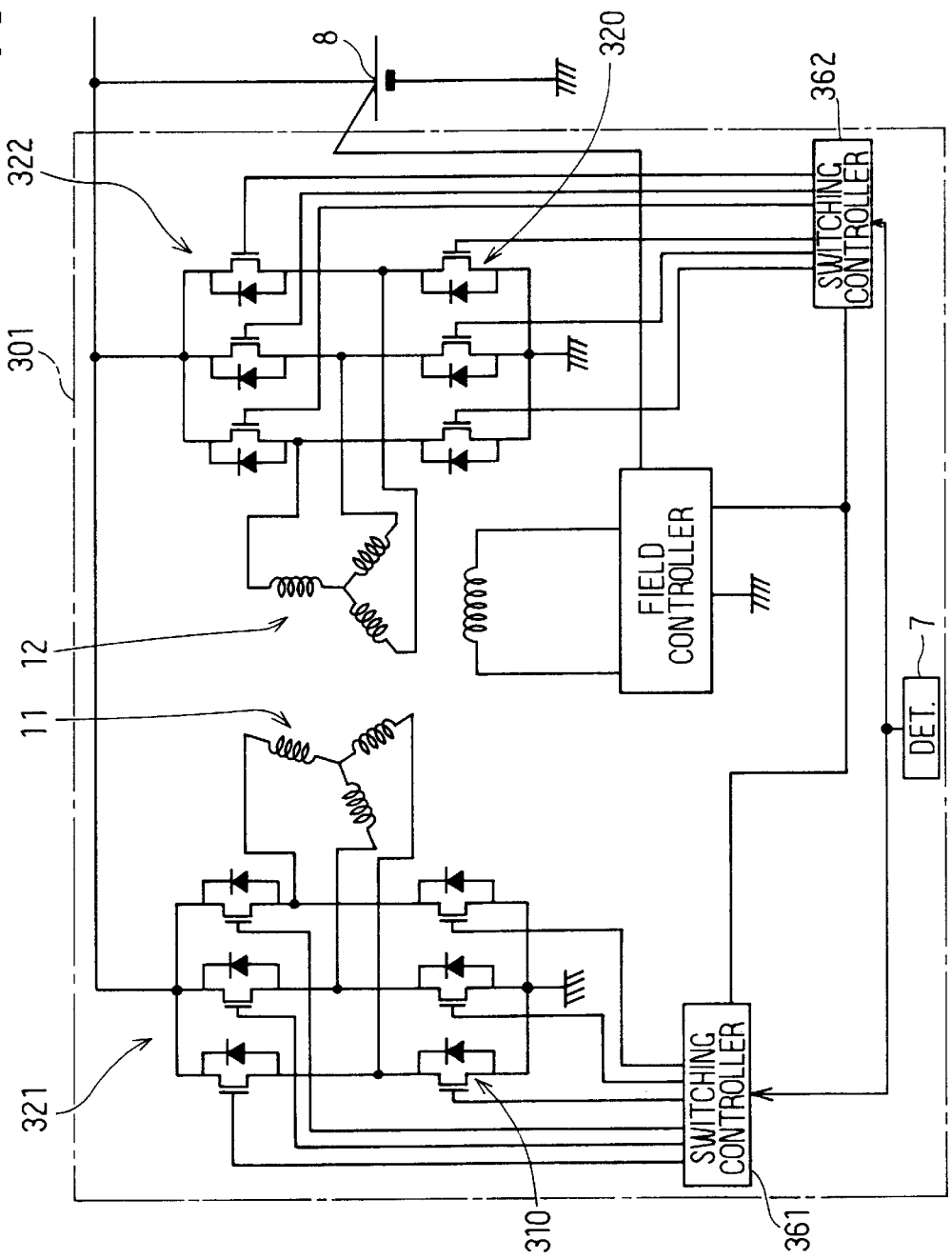
FIG. 8 is a circuit diagram of an electric power source system for a vehicle including an alternator according to a third embodiment of the present invention.

FIG. 8 shows a third embodiment of the present invention. In this embodiment, a first bridge 321 has six MOS transistors 310 to form a full bridge circuit. Also, a second bridge 322 has six MOS transistors 320 to form a full bridge circuit. The first bridge 321 is driven by a first switching controller 361. The second bridge 322 is driven by a second switching controller 362.

Both of the controllers 361 and 362 provide the same switching signals as the above-mentioned embodiments when the rotary electric machine 301 acts as a generator. For instance, the switching controller 361 provides the ground side MOS transistors 310 with the switching signal (C) on FIG. 5, the switching controller 362 provides the ground side MOS transistors 320 with the switching signal (D) on FIG. 5.

The rotary electric machine 301 can also act as a motor. The switching controllers 361 and 362 can provide a driving current from an outside source, the battery 8, to the stator. The switching controller 361 and 362 provide the bridges 321 and 322 with sequential switching signals to generate a rotating magnetic field on the stator. The ground side MOS transistors may be alternately turned on and off when the sequential switching signals are in on periods.

Figure 9:
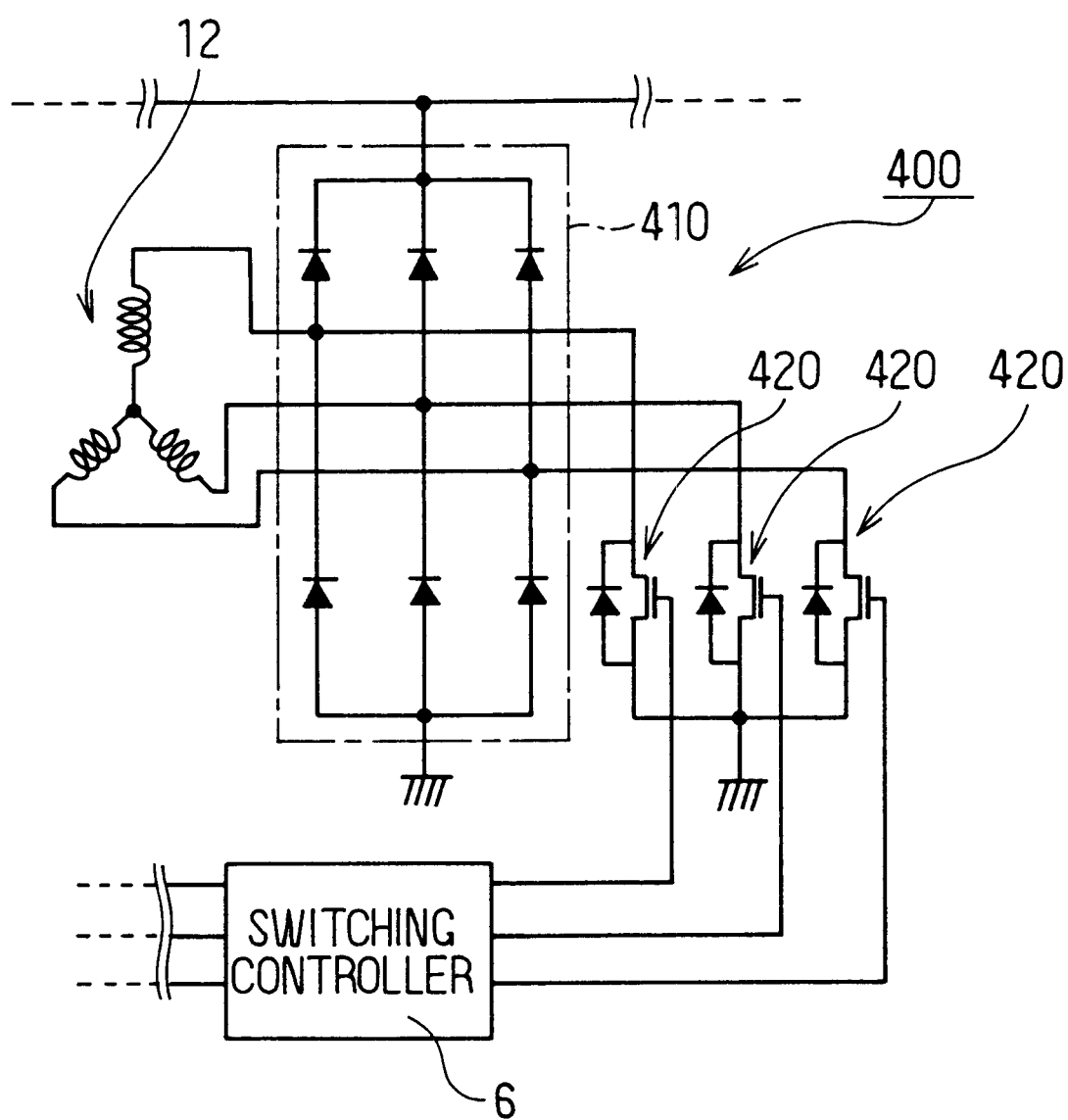
FIG. 9 is a partial circuit diagram of an alternator for a vehicle according to a fourth embodiment of the present invention.

FIG. 9 shows a fourth embodiment of the present invention. FIG. 9 shows only one side of the stator winding. The MOS transistors may be added to a conventional diode rectifier on an after-market basis. In this embodiment, a bridge 400 has a conventional diode rectifier 410 and has three MOS transistors 420 added to it.

Figure 10:
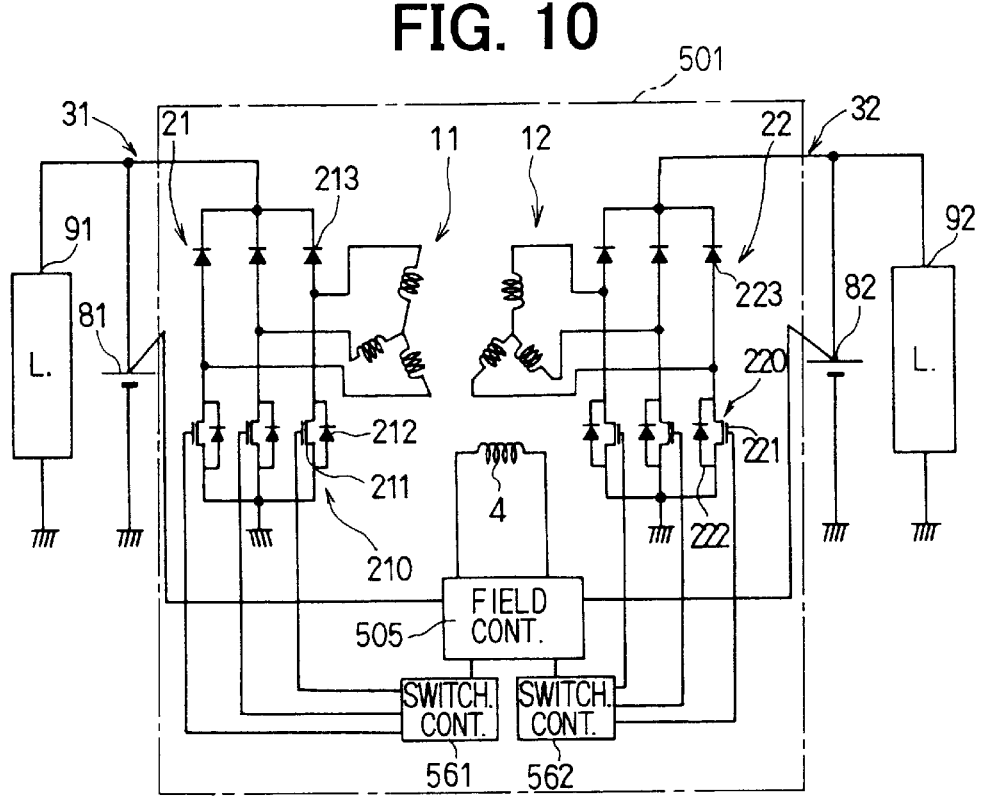
FIG. 10 is a circuit diagram of an electric power source system for a vehicle including an alternator according to a fifth embodiment of the present invention.

FIG. 10 shows a fifth embodiment of the present invention. In this embodiment, the system has an alternator 501, a high voltage battery 81, a high voltage load 91, an ordinary low voltage battery 82 and an ordinary low voltage loads 92. The alternator 501 has a similar construction to the third embodiment except for output terminals. The alternator 501 has two independent output terminals 31 and 32. The first bridge 21 is connected to the first output terminal 31. The second bridge 22 is connected to the second output terminal 32.

Output terminals from the first bridge 21 and the second bridge 22 are separated. The terminal 31 is connected to the high voltage battery 81 and the high voltage load 91. The terminal 32 is connected to the low voltage battery 82 and the low voltage loads 92.

In this embodiment, the voltage controller 505 detects voltage values of the high voltage battery 81 and the low voltage battery 82. The voltage controller 505 controls the voltage generated by regulating the field current supplied to the field coil 4. The switching controllers 561 and 562 provide high-frequency switching signals which are similar to the signals suplied to the MOS transistors 210 and 220 in the first embodiment.

Figure 11:
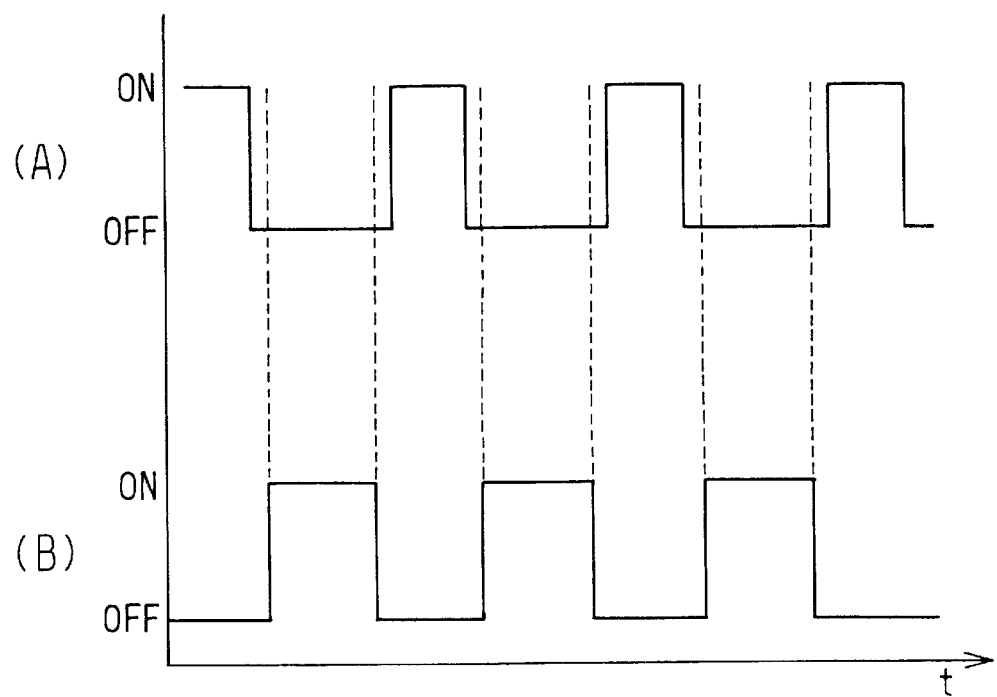
FIG. 11 is a graph showing switching signals (A) and (B) according to a fifth embodiment of the present invention.

Further, the voltage controller 505 determines duty ratios of the first bridge 21 and the second bridge 22 respectively. The voltage controller 505 outputs the determined duty ratios to the switching controllers 561 and 562. The switching controllers 561 and 562 provide switching signals which has a duty ratio determined in the voltage controller 505. Further, as shown in FIG. 11, the switching sequence is controlled so that the switching signal (A) for the bridge 21 and the switching signal (B) for the bridge 22 are in an inverted relationship to have no on periods at the same time.

As a result, a charging current is outputted even at a low rotational speed. It is possible to generate two voltages using one rotary electric machine. It is possible to regulate each output voltage individually. Further, it is possible to decrease magnetic noise.

Figure 12:
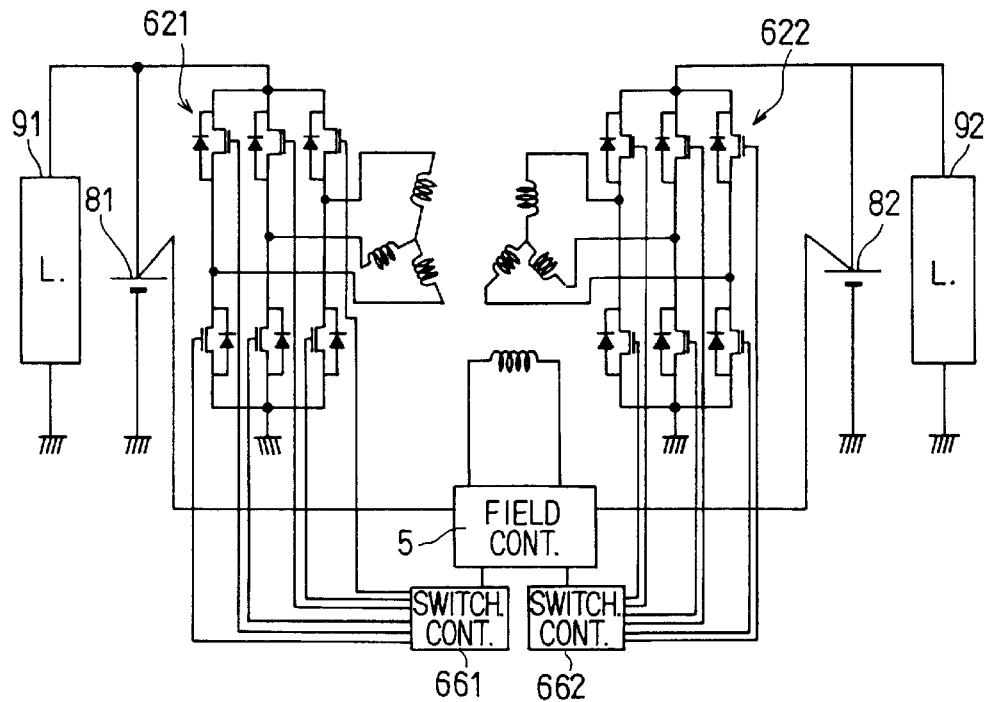
FIG. 12 is a circuit diagram of an electric power source system for a vehicle including an alternator according to a sixth embodiment of the present invention.

FIG. 12 shows a sixth embodiment of the present invention. In this embodiment, both the bridges 621 and 622 are full bridge circuits of MOS transistors. It is possible to use the electric rotary machine as a motor. The switching controllers 661 and 662 individually control driving currents of the bridges 621 and 622. Therefore, it is possible to set the ratio of electric power supplied from the batteries 81 and 82 according to charging conditions of the batteries 81 and 82. The ratio may be varied to prevent an over discharge of one of the batteries.

Figure 13:
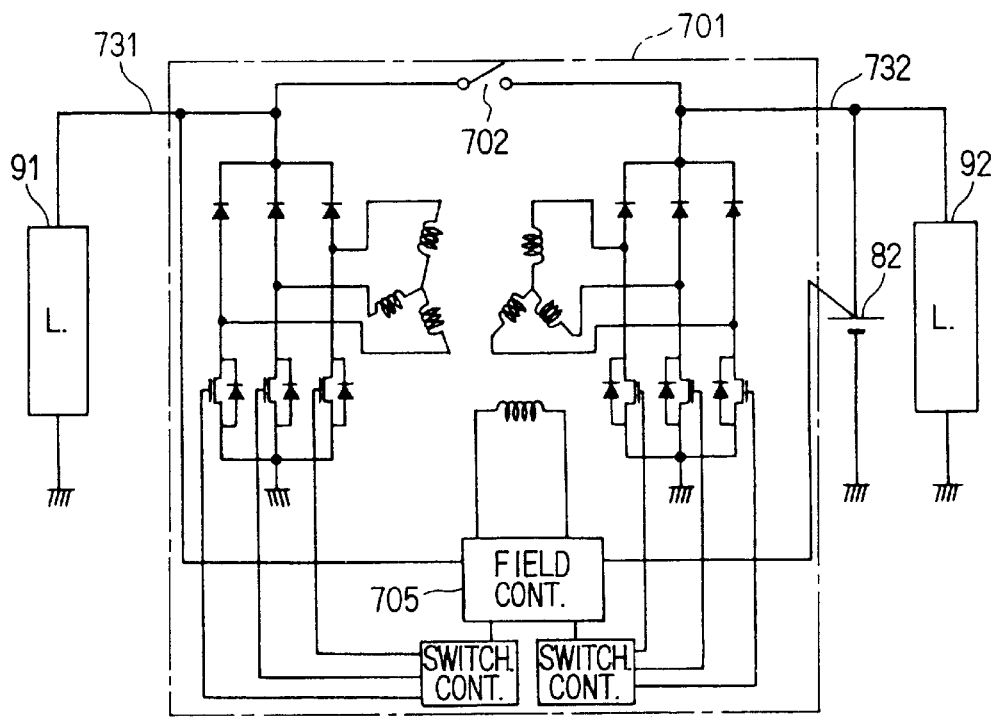
FIG. 13 is a circuit diagram of an electric power source system for a vehicle including an alternator according to a seventh embodiment of the present invention.

FIG. 13 shows a seventh embodiment of the present invention. The output terminals 731 and 732 are connectable via a switch 702. The alternator 701 provides two voltages when the switch 702 is opened and one voltage when the switch 702 is closed. Therefore, it is possible to achieve a larger output than an output by one winding. Further, it is also possible to output two voltages because two windings and bridges are independent when the switch 702 is open. Either a mechanical type switch or a semiconductor switch can be used as the switch 702.

In the case of the fifth, sixth and seventh embodiments, the sub-windings may have the same electric angle. In the case of the fifth, sixth and seventh embodiments, although the sub-windings have the same turn number for simplifying a manufacturing process, the turn number can be different from each other because it is possible to set the duty ratio to any selected value.

In each of the above-described embodiments, a device which has any type of switching element and a diode in parallel may be used instead of the MOS transistor. A discrete switching element and a diode can be also used instead of the MOS transistor. Further, it is not necessary to turn on and off the switches by the same period of time. For instance, two switching signals may have short on periods over lapped with each other. Further, it is possible to decrease the magnetic noise by avoiding turning on the bridges simultaneously, even when a ratio of an on period to an off period of one of the bridges is increased. Further, where the switching frequency of the bridges are the same, it is possible to avoid simultaneously turning on the bridges by controlling the switches so that the off period is longer than the on period.

Instead of the above-described embodiment, the poly-phase winding may have more than three phase windings. The winding may be made of a continuous wire. Further, the conductor of the winding may have a round cross section. The present invention can be applied to a generator, a motor or a rotary electric machine that selectively acts as a generator and a motor.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A rotary electric machine for a vehicle, comprising:
   a stator having a poly-phase winding disposed on a stator core, the poly-phase winding including a first sub-winding and a second sub-winding shifted by a predetermined electric angle from the first sub-winding;
   a first bridge connected to the first sub-winding, the first bridge being interchangeable between a rectifier bridge connection and a short circuit connection;
   a second bridge connected to the second sub-winding; and
   a controller for switching between the rectifier bridge connection and the short circuit connection at a high-frequency.

2. The rotary electric machine for a vehicle according to claim 1, further comprising an output terminal connected to the outputs of both the first bridge and the second bridge.

3. The rotary electric machine for a vehicle according to claim 1, wherein the second bridge is interchangeable between a rectifier bridge connection and a short circuit connection, and wherein the controller switches the first and second bridges.

4. The rotary electric machine for a vehicle according to claim 3, wherein the controller switches the first and second bridges in substantially opposite connection states so that one of the bridges is in the rectifier bridge connection when the other is in the short circuit connection.

5. The rotary electric machine for a vehicle according to claim 4, wherein a period of the short circuit connection is equal to or shorter than a period of the rectifier bridge connection.

6. The rotary electric machine for a vehicle according to claim 1, further comprising a detector for detecting a rotational speed of the rotary electric machine and for activating the switching operation of the controller when a detected rotational speed is in a predetermined low speed region.

7. The rotary electric machine for a vehicle according to claim 1, wherein the first bridge has a plurality of switching devices disposed on ground sides of the first bridge.

8. The rotary electric machine for a vehicle according to claim 7, wherein the switching devices are MOS transistors.

9. A rotary electric machine for a vehicle, comprising:
   a stator having a poly-phase winding disposed on a stator core, the poly-phase winding including a first sub-winding and a second sub-winding;
   a first bridge connected to the first sub-winding, the first bridge being interchangeable between a rectifier bridge connection and a short circuit connection;
   a second bridge connected to the second sub-winding, the second bridge being interchangeable between a rectifier bridge connection and a short circuit connection; and
   a controller for switching the first and second bridges between the rectifier bridge connection and the short circuit connection at a high-frequency, the controller switching the first and second bridges in substantially opposite connection states so that one of the bridge is in the rectifier bridge connection when the other is in the short circuit connection.

10. The rotary electric machine for a vehicle according to claim 1, further comprising a detector for detecting a rotational speed of the rotary electric machine and for activating the switching operation of the controller when a detected rotational speed is in a predetermined low speed region.

11. A rotary electric machine for a vehicle, comprising:
    a stator having a poly-phase winding disposed on a stator core, the poly-phase winding including a first sub-winding and a second sub-winding;
    a first bridge connected to the first sub-winding, the first bridge being interchangeable between a rectifier bridge connection and a short circuit connection;
    a second bridge connected to the second sub-winding;
    a controller for switching between the rectifier bridge connection and the short circuit connection at a high-frequency;
    a first output terminal connected to an output of the first bridge; and
    a second output terminal connected to an output of the second bridge.

12. The rotary electric machine for a vehicle according to claim 11, wherein the second sub-winding is shifted by a predetermined electric angle from the first sub-winding.

13. The rotary electric machine for a vehicle according to claim 11, wherein the second bridge is interchangeable between a rectifier bridge connection and a short circuit connection, and wherein the controller switches the first and second bridges.

14. The rotary electric machine for a vehicle according to claim 13, wherein the controller switches the first and second bridges in substantially opposite connection states so that one of the bridge is in the rectifier bridge connection when the other is in the short circuit connection.

15. The rotary electric machine for a vehicle according to claim 14, wherein the second sub-winding is shifted by a predetermined electric angle from the first sub-winding.

16. The rotary electric machine for a vehicle according to claim 13, wherein the controller sets individual duty ratios of the short circuit connection to the rectifier bridge connection for both the first and second bridges.

17. The rotary electric machine for a vehicle according to claim 11, further comprising a switch disposed between the first and second output terminals.

18. The rotary electric machine for a vehicle according to claim 11, wherein the first and second output terminals are controlled to be different voltages by the controller.

19. The rotary electric machine for a vehicle according to claim 11, wherein the first bridge has a plurality of switching devices disposed on ground sides of the first bridge.

20. The rotary electric machine for a vehicle according to claim 19, wherein the switching devices are MOS transistors.

* * * * *